(12) United States Patent
Fourney

(10) Patent No.: US 7,249,669 B2
(45) Date of Patent: Jul. 31, 2007

(54) APPARATUS AND METHODS FOR HIGH SPEED CONVEYOR SWITCHING

(75) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 11/237,621

(22) Filed: Sep. 28, 2005

(65) Prior Publication Data

US 2006/0070857 A1 Apr. 6, 2006

Related U.S. Application Data

(60) Provisional application No. 60/613,857, filed on Sep. 28, 2004.

(51) Int. Cl.
 *B65G 47/46* (2006.01)
(52) U.S. Cl. .................................. 198/370.09; 198/779
(58) Field of Classification Search ........... 198/370.01, 198/370.03, 370.09, 370.1, 371.3, 779, 853
 See application file for complete search history.

(56) References Cited

U.S. PATENT DOCUMENTS

| | | | |
|---|---|---|---|
| 1,931,454 A | 10/1933 | Anderson | 198/127 |
| 2,296,201 A | 9/1942 | Carter | 216/57 |
| 2,566,417 A | 9/1951 | Holm | 198/31 |
| 2,777,560 A | 1/1957 | Campos | 197/177 |
| 3,292,767 A | 12/1966 | Lobdell et al. | 198/34 |
| 3,373,860 A | 3/1968 | Lindgren et al. | 198/34 |
| 3,653,489 A | 4/1972 | Tullis et al. | 198/110 |
| 3,675,760 A | 7/1972 | Burrage et al. | 198/183 |
| 3,857,472 A | 12/1974 | Klint | 198/20 |
| 3,973,672 A | 8/1976 | Frost | 198/283 |
| 4,044,897 A | 8/1977 | Maxted | 214/11 R |
| 4,143,756 A | 3/1979 | Chorlton | 198/457 |
| 4,176,741 A | 12/1979 | Vogel | 198/457 |
| 4,262,794 A | 4/1981 | Bourgeois | 198/459 |
| 4,264,002 A | 4/1981 | Van Der Schie | 198/365 |
| 4,736,864 A | 4/1988 | Whitford | 220/209 |
| 5,074,405 A | 12/1991 | Magolske et al. | 198/786 |

(Continued)

FOREIGN PATENT DOCUMENTS

JP 03-088617 4/1991

(Continued)

*Primary Examiner*—James R. Bidwell

(57) ABSTRACT

Disclosed are conveyors and methods for making and using a conveyor. In some embodiments, the conveyor comprises a modular conveyor belt that includes at least one mat-top chain having at least one cavity and at least one first roller disposed in the cavity of the mat-top chain. The conveyor further includes a longitudinal second roller that operatively couples to the first roller such that the longitudinal second roller and the first roller are rotating as the conveyor belt travels along the longitudinal second roller. In another embodiment, the method for making a conveyor may comprise the steps of linking a plurality of mat-top chains together to form a modular conveyor belt; disposing a first roller into a cavity of the mat-top chain; and placing a longitudinal second roller underneath the conveyor belt such that as the conveyor belt travels along the longitudinal second roller, the first roller operatively couples to the longitudinal second roller causing the second roller and the first roller to rotate. In another embodiment, the conveyor includes rollers in alternating directions for selectively switching conveyor objects in a plurality of directions. In another embodiment, a plurality of modular conveyor belts is configured such that individual conveyor belts divert objects in different directions.

21 Claims, 9 Drawing Sheets

U.S. PATENT DOCUMENTS

| | | | |
|---|---|---|---|
| 5,090,553 A | 2/1992 | Focke | 198/377.06 |
| 5,092,447 A | 3/1992 | Wyman | 198/374 |
| 5,101,958 A | 4/1992 | LeMay et al. | 198/436 |
| 5,145,049 A | 9/1992 | McClurkin | 198/374 |
| 5,238,099 A * | 8/1993 | Schroeder et al. | 198/779 |
| 5,333,722 A | 8/1994 | Ouellette | 198/436 |
| 5,339,030 A | 8/1994 | Hayashi | 324/207.23 |
| 5,400,896 A | 3/1995 | Loomer | 198/415 |
| 5,551,543 A | 9/1996 | Mattingly et al. | 198/370.09 |
| 6,073,747 A | 6/2000 | Takino et al. | 198/370.09 |
| 6,148,900 A | 11/2000 | Yamasaki et al. | 198/779 |
| 6,244,426 B1 | 6/2001 | Murano et al. | 198/784 |
| 6,269,933 B1 | 8/2001 | Schuitema et al. | 198/446 |
| 6,318,544 B1 | 11/2001 | O'Connor et al. | 198/853 |
| 6,367,616 B1 | 4/2002 | Lapeyre et al. | 198/779 |
| 6,382,393 B2 * | 5/2002 | Itoh et al. | 198/370.09 |
| 6,401,936 B1 | 6/2002 | Isaacs et al. | 209/656 |
| 6,494,312 B2 | 12/2002 | Costanzo | 198/779 |
| 6,568,522 B1 | 5/2003 | Boelaars | 198/347.2 |
| 6,571,937 B1 * | 6/2003 | Costanzo et al. | 198/370.09 |
| 6,648,125 B1 | 11/2003 | Bershadsky | 198/460.1 |
| 6,681,922 B2 | 1/2004 | Corley et al. | 198/853 |
| 6,758,323 B2 | 7/2004 | Costanzo | 198/457.02 |
| 6,923,309 B2 | 8/2005 | Costanzo | 198/411 |
| 6,968,941 B2 * | 11/2005 | Fourney | 198/779 |
| 6,986,420 B2 | 1/2006 | Weiser et al. | 198/853 |
| 6,997,306 B2 | 2/2006 | Sofranec et al. | 198/779 |
| 7,007,792 B1 * | 3/2006 | Burch | 198/779 |
| 7,073,651 B2 | 7/2006 | Costanzo et al. | 193/35 |
| 7,111,722 B2 * | 9/2006 | Burch | 198/779 |
| 2005/0023105 A1 | 2/2005 | Constanzo et al. | |
| 2005/0072656 A1 | 4/2005 | Constanzo | |
| 2005/0109582 A1 | 5/2005 | Fourney | |
| 2006/0032727 A1 | 2/2006 | Burch | |
| 2006/0070855 A1 | 4/2006 | Lemm | |
| 2006/0070857 A1 | 4/2006 | Fourney | |

FOREIGN PATENT DOCUMENTS

| | | |
|---|---|---|
| JP | 08-277029 | 10/1996 |

\* cited by examiner

APPARATUS AND METHODS FOR HIGH SPEED CONVEYOR SWITCHING

CROSS-REFERENCE TO RELATED APPLICATION

This application claims priority to copending U.S. provisional application entitled, "APPARATUS AND METHODS FOR HIGH SPEED CONVEYOR SWITCHING" having Ser. No. 60/613,857, filed Sep. 28, 2004, which is entirely incorporated herein by reference.

TECHNICAL FIELD

The invention relates generally to power-driven conveyors.

DESCRIPTION OF THE RELATED ART

As is known, manufacturing, distributing, shipping and other facilities frequently utilize conveyor systems for handling a wide assortment of products. Additionally, conveyors frequently utilize switches for diverting products to specific destinations and dividing products into two or more outgoing streams or rows. Switches for diverting products or cases of products from conveyors historically used a guide hinged at one end. The guide would deflect the incoming case to two or more outgoing streams. These guide systems experienced widespread utilization but were limited in speed.

Higher speed switches were developed more than thirty years ago and are still in use in many conveyor systems. Relative to the speed and reliability requirements of today's conveyor systems, however, the higher speed switches require long conveyor lengths in higher speed applications and are maintenance intensive.

SUMMARY

Disclosed are conveyors and methods for making and using a conveyor. In some embodiments, the conveyor comprises a conveyor belt including a plurality of cavities, a plurality of first diverting rollers, and a plurality of second diverting rollers, where each diverting roller is disposed in a cavity. The conveyor also includes a first transverse roller having an axis that extends in a direction of travel of the conveyor belt and that can couple to the plurality of first diverting rollers to cause the first diverting rollers to rotate as they travel along the first transverse roller and a second transverse roller having an axis that extends in the direction of travel of the conveyor belt and that can couple to the plurality of second diverting rollers to cause the second diverting rollers to rotate as they travel along the second transverse roller. The diverting rollers are oriented such that each of the first diverting rollers is oriented at a first angle relative to the direction of travel of the conveyor belt and each of the second diverting rollers is oriented at a second angle relative to the direction of travel of the conveyor belt.

BRIEF DESCRIPTION OF THE DRAWINGS

The disclosed conveyors and methods can be better understood with reference to the following drawings. The components in the drawings are not necessarily to scale.

DETAILED DESCRIPTION

Disclosed herein are conveyors and methods of making and using conveyors for switching objects from one line to two or more lines in a short length of a conveyor system. The switching can be performed using a single conveyor capable of selectively diverting objects in more than one direction or through multiple adjacent conveyors, each configured to selectively divert objects in a different direction.

In addition, disclosed are conveyors and methods for conveying objects that reduce slippage of conveyor rollers. Due to that reduced slippage, the conveyors more effectively divert objects on the conveyor belt. In some embodiments, the conveyor includes first rollers disposed in the conveyor belt and at least one second roller located underneath the conveyor belt that can rotate in a direction transverse to the direction of travel of the conveyor belt. As the conveyor belt travels along the second roller, the second roller operatively couples with the first rollers causing the first rollers and the second roller to rotate. Because of the rotation of the second roller, the first rollers rotate with reduced slippage.

Figure 1:
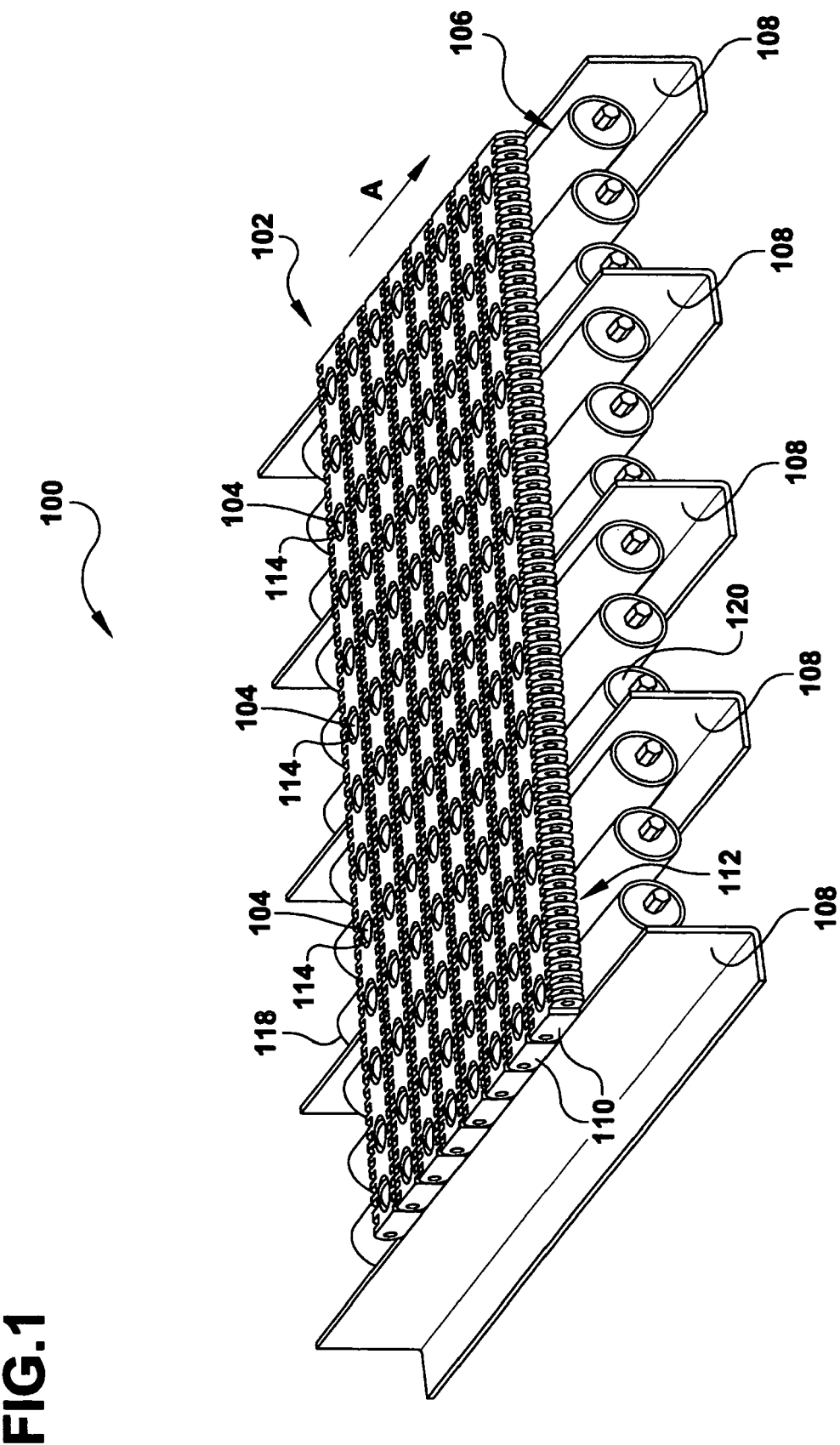
FIG. 1 is a perspective view of an embodiment of a section of a conveyor that includes a conveyor belt having a first roller that is operatively coupled to a second roller.

Referring now in more detail to the figures in which like referenced numerals identifying corresponding parts, FIG. 1 illustrates a perspective view of an embodiment of a section of a conveyor 100 in which a plurality of first rollers 104 are disposed in a conveyor belt 102. As indicated in this figure, the conveyor belt 102 is modular and includes at least one mat-top chain 110. The mat-top chain 110 has a plurality of cavities 114, in which the first rollers 104 are disposed. By way of example, the first rollers comprise plastic wheels that include outer rubber layers or tires (see discussion of FIGS. 6A and 6B). That configuration increases friction between the first rollers 104 and surfaces that the rollers contact (i.e., the surfaces of the second rollers 106 described below) so as the reduce slippage of the first rollers. The first rollers 104 are aligned at an angle α (shown in FIG. 3) relative to the direction of the travel of the conveyor belt 102 so as to laterally divert objects conveyed by the conveyor belt. By way of example, α may range from approximately 1 to 89 degrees. Because the first rollers 104 are used to divert objects, the first rollers may be designated as diverting rollers. The mat-top chain 110 of FIG. 1 includes hinge elements 112 that can be used to link other mat-top chains 110 to form a continuous conveyor belt 102.

With further reference to FIG. 1, the conveyor 100 further includes a plurality of second rollers 106 and support members 108. The second rollers 106 are located underneath the conveyor belt 102 between the support members 108 and are free to rotate in a direction that is transverse, e.g., substantially perpendicular, to the direction of travel of the conveyor belt indicated by arrow A. By way of example, the second rollers 106 comprise elongated metal rollers that may optionally include eurethane outer sleeves. Because the second rollers 106 rotate in a direction that is transverse to the direction of travel of the conveyor belt 102, the second rollers 106 may be designated as transverse rollers. As the conveyor belt 102 travels in direction A along the second rollers 106, the second rollers can be positioned to engage the first rollers 104. Such engagement causes the first rollers 104 and the second rollers 106 to rotate. That rotation is facilitated by the high coefficient of friction that exists between the rubber layers of the first rollers 104 and the second rollers 106. As the first rollers 104 rotate along the second rollers 106, the first rollers pass over from first ends 118 to second ends 120 of the second rollers to trace a helical path 308 (shown in FIG. 3) on the second rollers. Because the second rollers 106 rotate when they engage the first rollers 104 as opposed to being fixed as prior art wear strips, the first rollers rotate with reduced slippage. In fact, after an initial start up period, the first rollers 104 rotate along the second rollers 106 with nearly no slipping. This, in turn, enables more effective diverting of the objects carried by the conveyor belt 102. For example, objects can be diverted more quickly, in a shorter amount of space (i.e., length of conveyor), or both.

In some embodiments, the second rollers 106 are vertically displaceable so as to be capable of being moved toward or away from the mat-top chain 110 to engage or disengage the first rollers 104. The vertical movement of the second rollers 106 can be facilitated by various components such as an air actuator, hydraulic actuator, ball screw actuator, or solenoid actuator. Alternatively, however, in cases in which the first rollers 104 are always to be driven, the second rollers 106 are not displaceable such that they continuously engage the first rollers as the conveyor belt 102 travels in direction A. In yet a further alternative, the second rollers 106 are horizontally displaceable so as to be brought into an out of contact with first rollers 104. Such an arrangement may be particularly advantageous in situations in which the conveyor belt is provided with transverse rows of first rollers 102 that alternatingly face different directions (e.g., a leftward direction, rightward direction, the leftward direction, and so forth across the row). Horizontal displacement of the second rollers 106 in such a case may enable switching between diversion of objects in two separate (e.g., opposite) directions (e.g., from a leftward direction to a rightward direction and vice versa).

Figure 2:
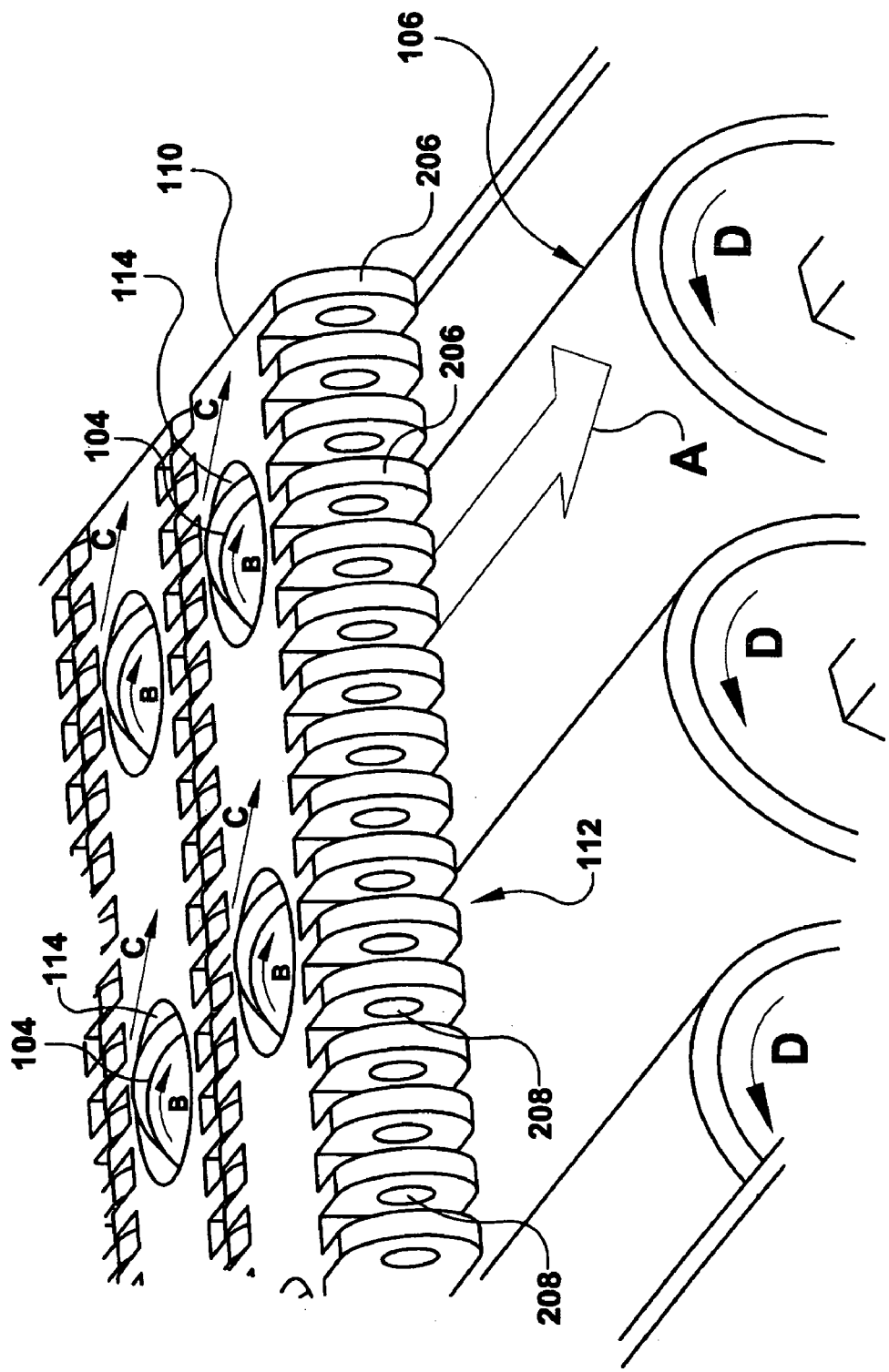
FIG. 2 is a more detailed view of a section of the conveyor of FIG. 1.

FIG. 2 is a detailed view of a section of the conveyor of FIG. 1. As shown in FIG. 2, the mat-top chain 110 includes hinge elements 112 that have multiple interleaved hinge elements 206, each of which has a hole 208 that is axially aligned with the hole 208 of an adjacent element 206. In order to link two mat-top chains 110, the axially-aligned holes 208 of the chains 110 are aligned and a rod (not shown) is placed through the axially-aligned holes 208. A plurality of mat-top chains 110 may therefore be linked together to form a continuous conveyor belt 102.

As described above, the mat-top chain 110 further includes cavities 114 in which the first rollers 104 are disposed and in which the first rollers can rotate. As the conveyor belt 102 travels in direction A, the second rollers 106 can be made to engage the first rollers 104 causing the first rollers to rotate in direction B. The objects on the conveyor belt 102 can therefore be conveyed in a direction C. Notably, the second rollers rotate in direction D. An alternative embodiment includes a plurality of rows of first rollers, where, for example, the rollers in some of the rows is configured in a direction different from the direction of roller rotation in the other rows to provide selective conveyance of objects in multiple directions.

Figure 3:
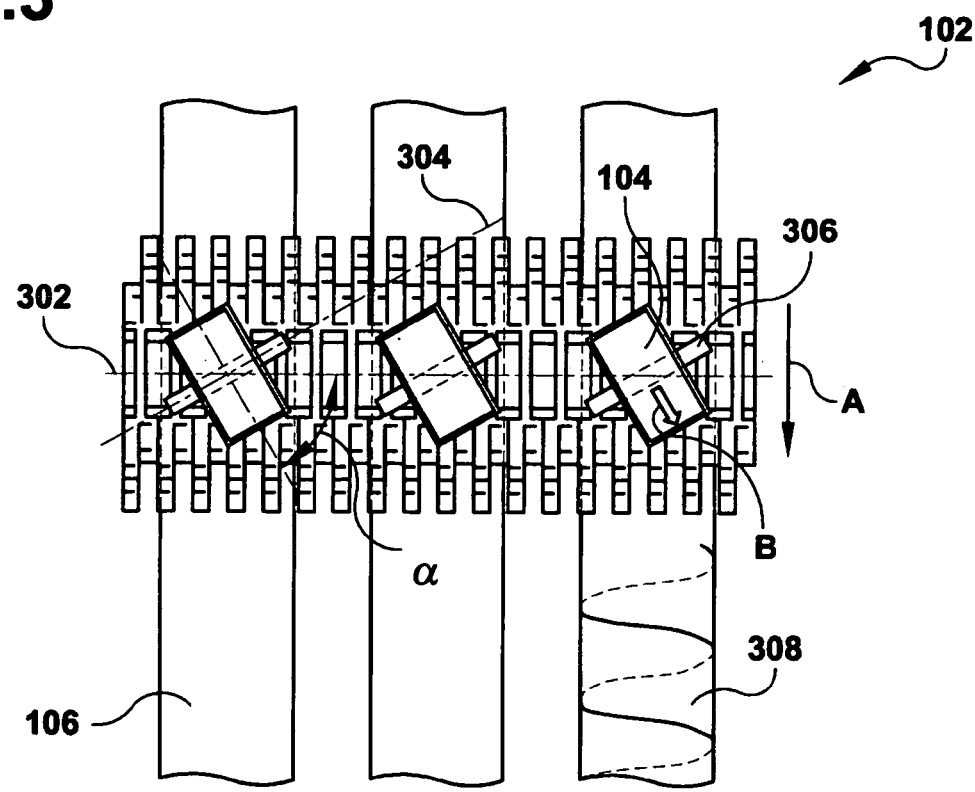
FIG. 3 is a top view of an embodiment of a section of the conveyor of FIG. 1.

FIG. 3 is a top view of an embodiment of a section of the conveyor of FIG. 1. In FIG. 3, the first rollers 104 are arranged along the axes 302. The mat-top chain 110 includes first roller axles 306 that are aligned on the rotational axes 304. The first roller axles 306 are coupled with the mat-top chain 110 and disposed within the cavities 114. The first roller axles 306 extend through openings of the first rollers 104 to enable the first rollers 104 to rotate about their axes 302 when engaged with the second rollers 106. The alignment of the first rollers 104 enables the first rollers 104 from below to convey objects on the conveyor belt 102 at an angle cc relative to the direction of travel A.

As is further depicted in FIG. 3, the second rollers 106 are located underneath the conveyor belt 102 such that the second rollers 106 can engage the first rollers 104 from below as the belt travels in direction A along the second rollers 106.

Figure 4:
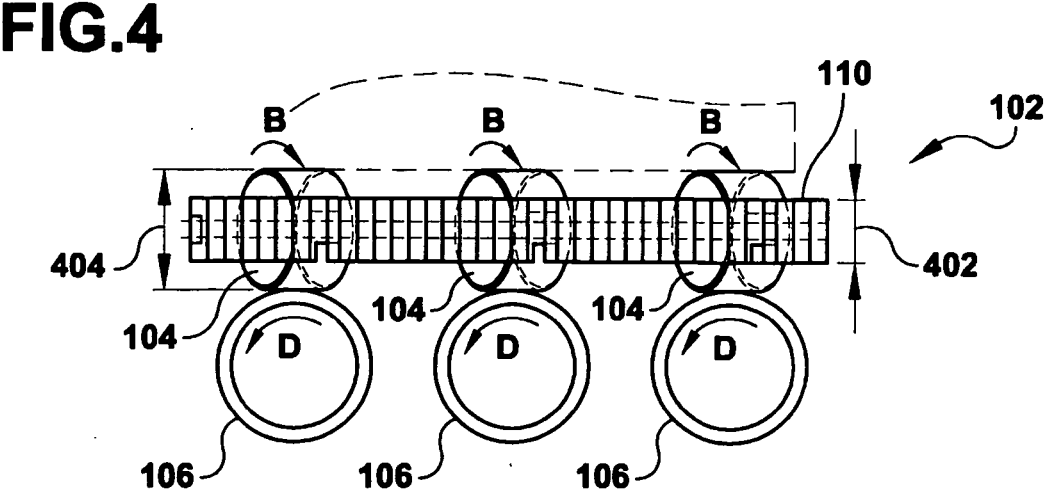
FIG. 4 is a front view of an embodiment of a section of the conveyor of FIG. 1.

FIG. 4 is a front view of an embodiment of a section of the conveyor of FIG. 1. The mat-top chain 110 has a height dimension 402 that is smaller than the height dimension 404 of the first rollers 104. As the belt 102 travels in direction A and the first rollers 104 engage the second rollers 106, the first rollers rotate in direction B and the second rollers 106 rotate in an opposing direction D (counterclockwise in the orientation shown in FIG. 4).

Figure 5:
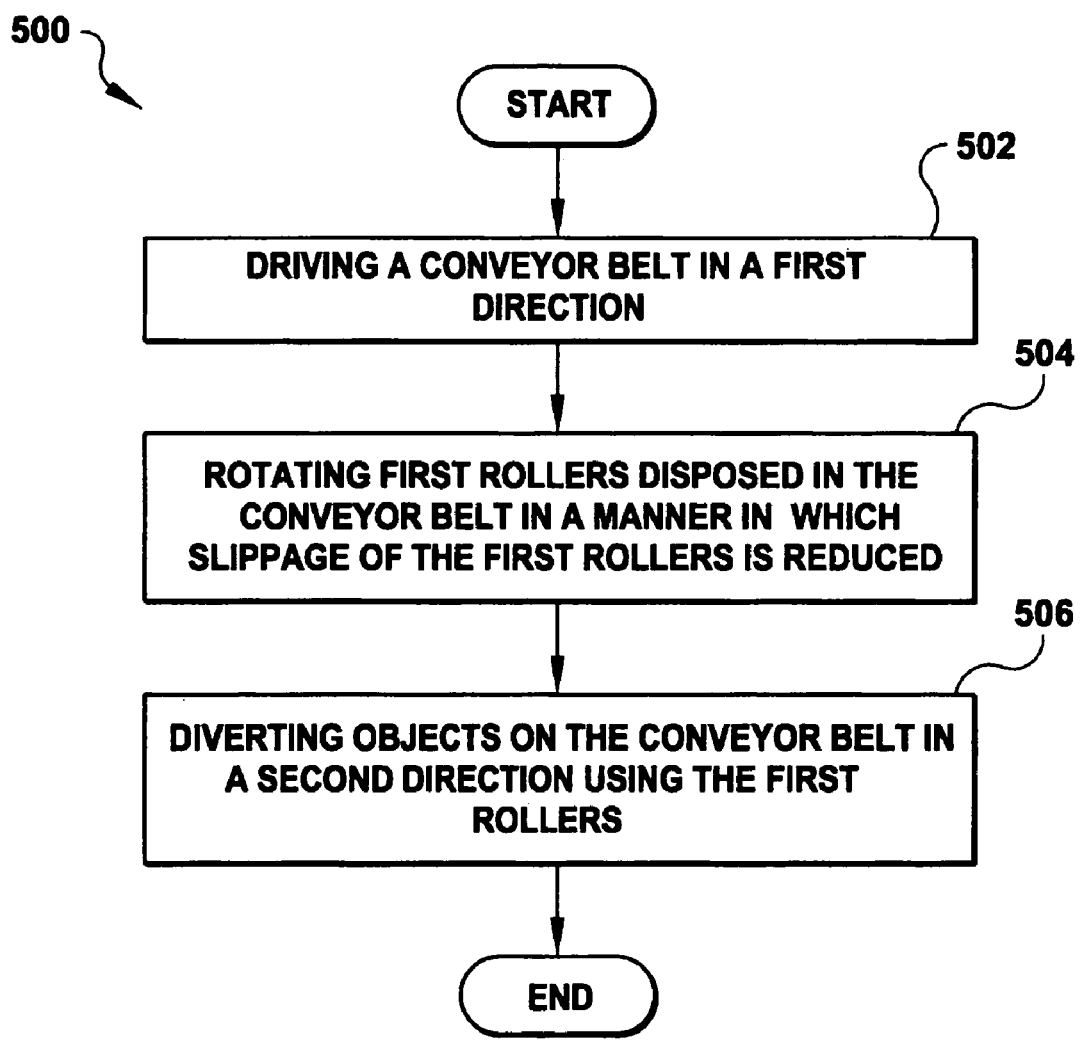
FIG. 5 is a flow diagram that illustrates an embodiment of a method for conveying objects.

FIG. 5 is a flow diagram that illustrates an embodiment of a method 500 for conveying objects on a conveyor belt. Beginning with block 502 of FIG. 5, the method 500 includes driving a conveyor belt in first direction.

In block 504, first rollers within the conveyor belt are rotated in a manner in which slippage of the first rollers is reduced. For example, as the conveyor belt travels in direction A, the first rollers engage second rollers that are likewise free to rotate.

In block 506, the objects on the conveyor belt 102 are diverted in a second direction using the first rollers. The objects can be displaced towards either the sides or the middle of the conveyor belt.

Figure 6A:
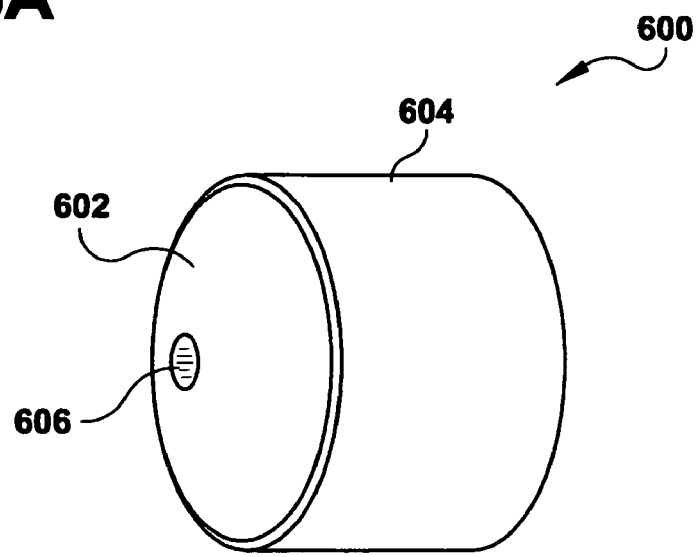
FIG. 6A is a perspective view of an example embodiment of a first roller.
Figure 6B:
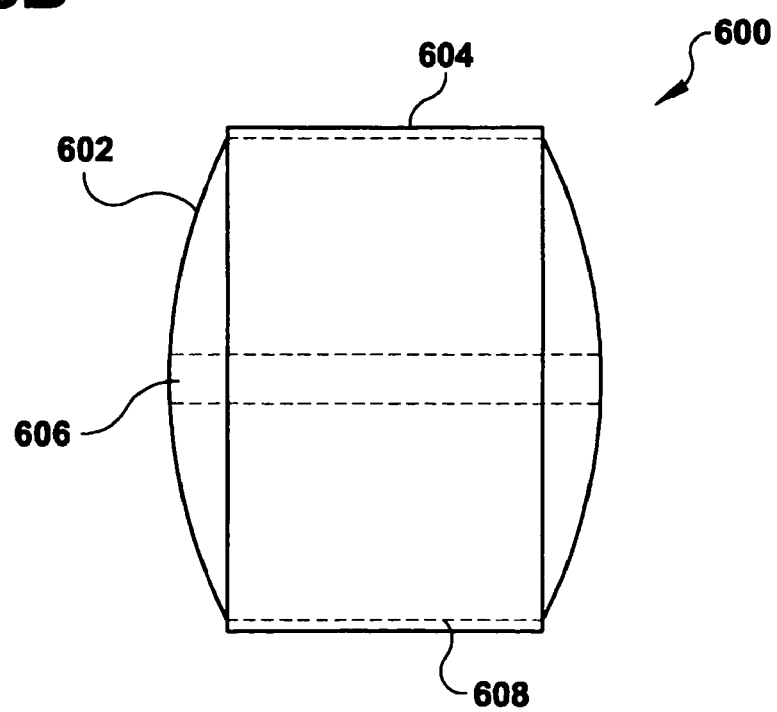
FIG. 6B is a side view of the roller of FIG. 6A.

FIGS. 6A and 6B illustrate an example embodiment for the first rollers described above. As indicated in these figures, a roller 600 comprises an inner wheel 602 surrounded by an outer tire 604. By way of example, the inner wheel is constructed of a lightweight, rigid material, such as a plastic or metal, and the outer tire 604 is made of a resilient material having a high coefficient of friction, such as a rubber. The outer-tire 604 is provided around an outer surface 608 of the inner wheel 602 (FIG. 6B). The inner wheel 602 also comprises an opening 606 through which a roller axle may pass to rotatably mount the roller 600 in a conveyor belt (e.g., belt 102). Due to the outer-tire 606, improved gripping of a surface, such as that of the second rollers, can be achieved thereby reducing slippage.

Figure 7:
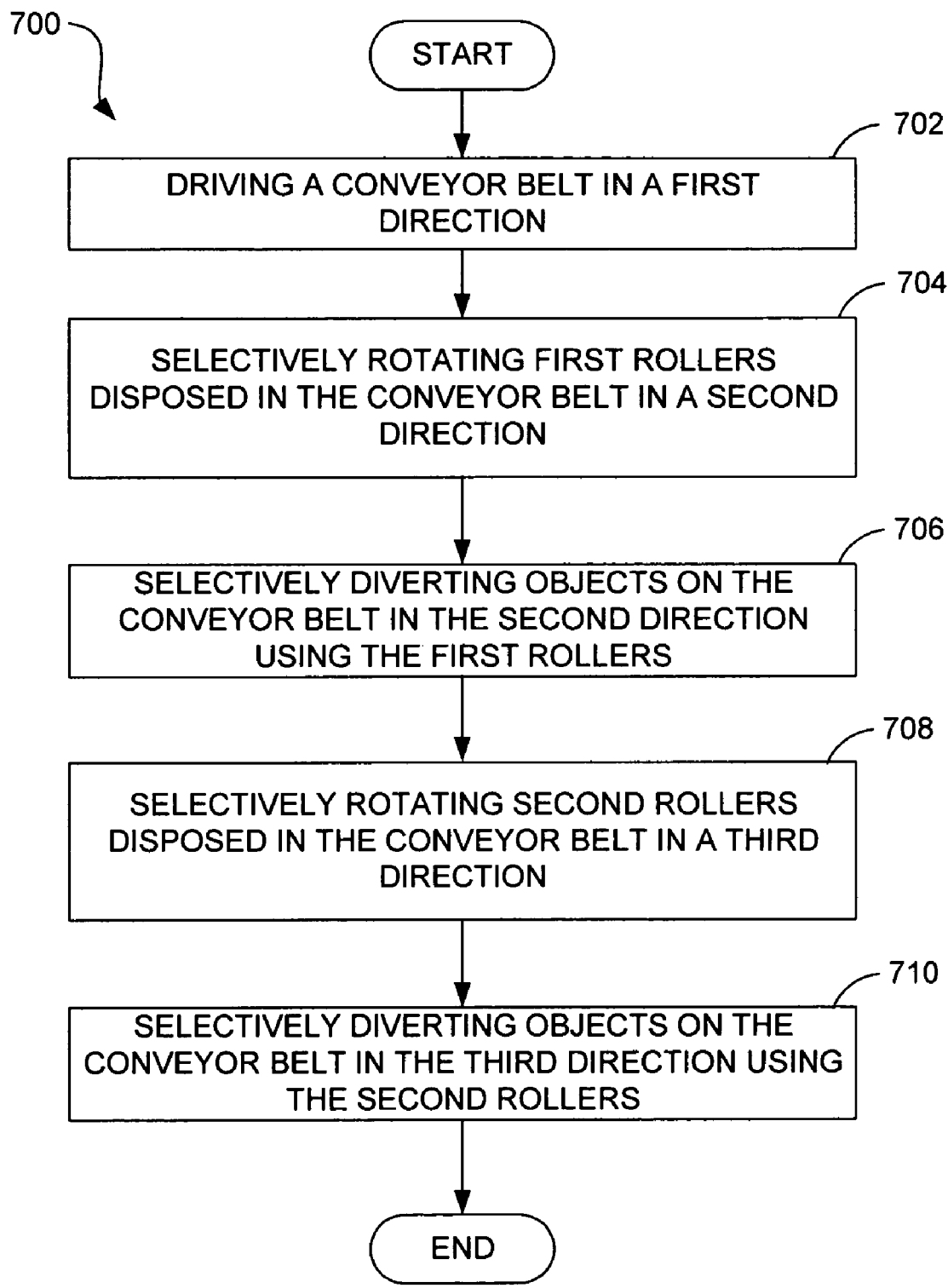
FIG. 7 is a flow diagram that illustrates an embodiment of a method of switching in a conveyor system.

FIG. 7 is a flow diagram that illustrates an embodiment of a method 700 of switching in a conveyor system. Beginning with block 702, the method 700 includes driving a conveyor belt in a first direction.

In block 704, first rollers are selectively rotated in a second direction. The first rollers are selectively rotated through, for example, selective alignment and coupling with specific longitudinal rollers. In block 706, the objects on the conveyor belt 102 are diverted in a second direction using the first rollers. The objects can be selectively displaced towards either the sides or the middle of the conveyor belt.

In block 708, second rollers are selectively rotated in a third direction. The second rollers are selectively rotated through, for example, selective alignment and coupling with specific longitudinal rollers. In block 710, the objects on the conveyor belt 102 are diverted in a third direction using the first rollers. The objects can be selectively displaced towards either the sides or the middle of the conveyor belt.

Figure 8A:
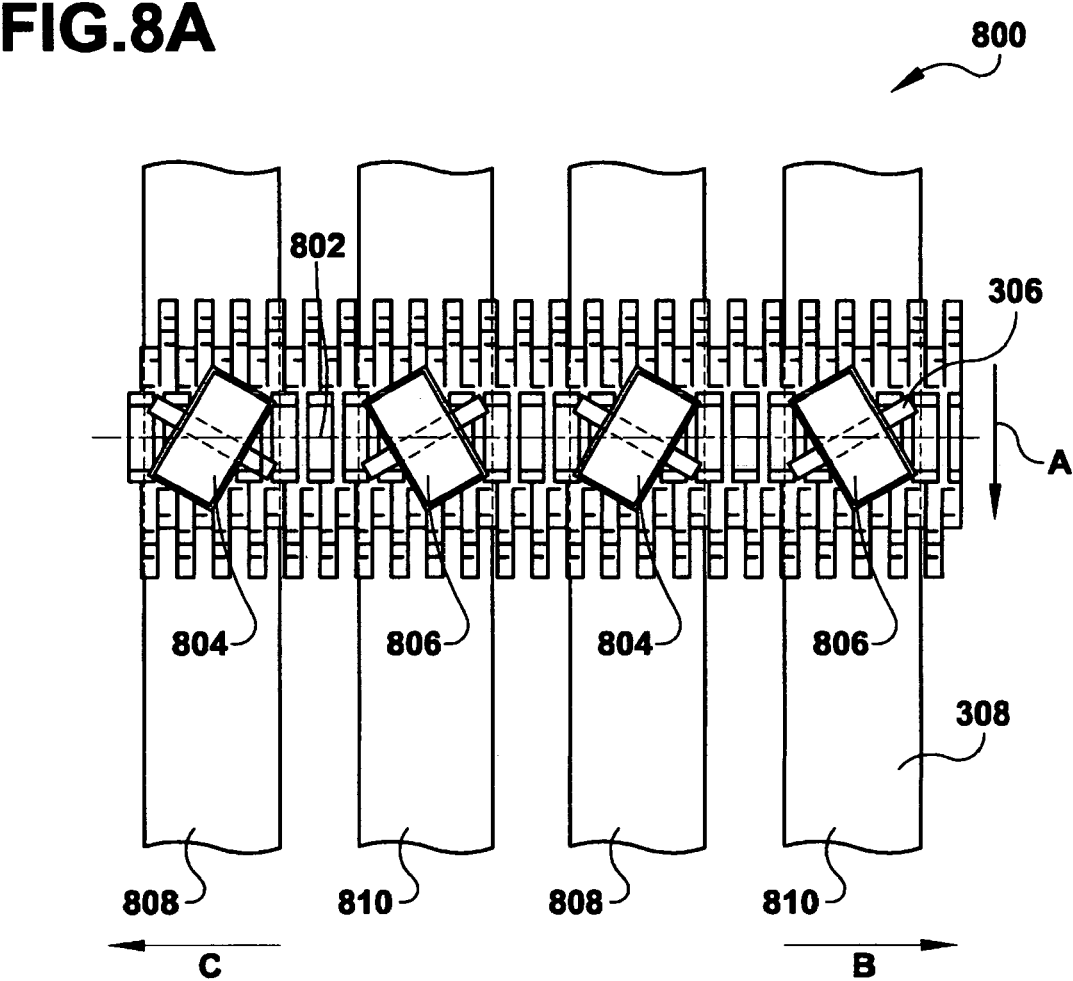
FIG. 8A is a top view of an embodiment of an apparatus for switching in a conveyor system.
Figure 8B:
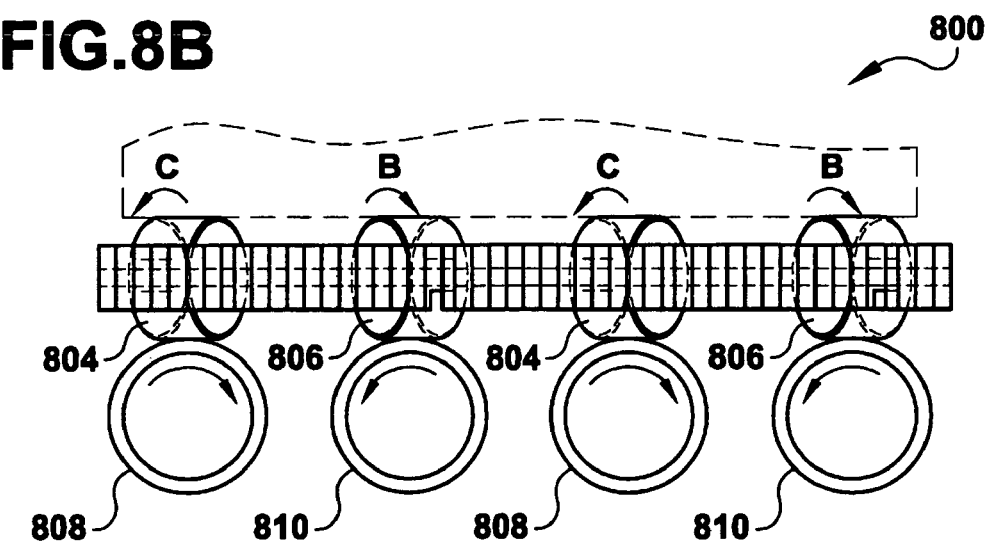
FIG. 8B is a side view of an embodiment of an apparatus for switching in a conveyor system.

FIGS. 8A and 8B illustrate top and side views respectively of an exemplary embodiment of an apparatus for switching in a conveyor system. As indicated by the figure and in accordance with above described roller operation, the belt travels in direction A and the first rollers 804 are selectively engaged by the corresponding rollers 808 to divert an object generally in direction C. Alternatively, the second rollers 806 are selectively engaged by the corresponding rollers 810 to divert an object generally in direction B. It will be appreciated by one of ordinary skill in the art that this conveyor switching apparatus permits conveyor objects to selectively remain undiverted and continue in direction A or be diverted in either of directions B or C. One of ordinary skill will further appreciate that additional rollers can be included to provide for more than two diversion paths.

Figure 9:
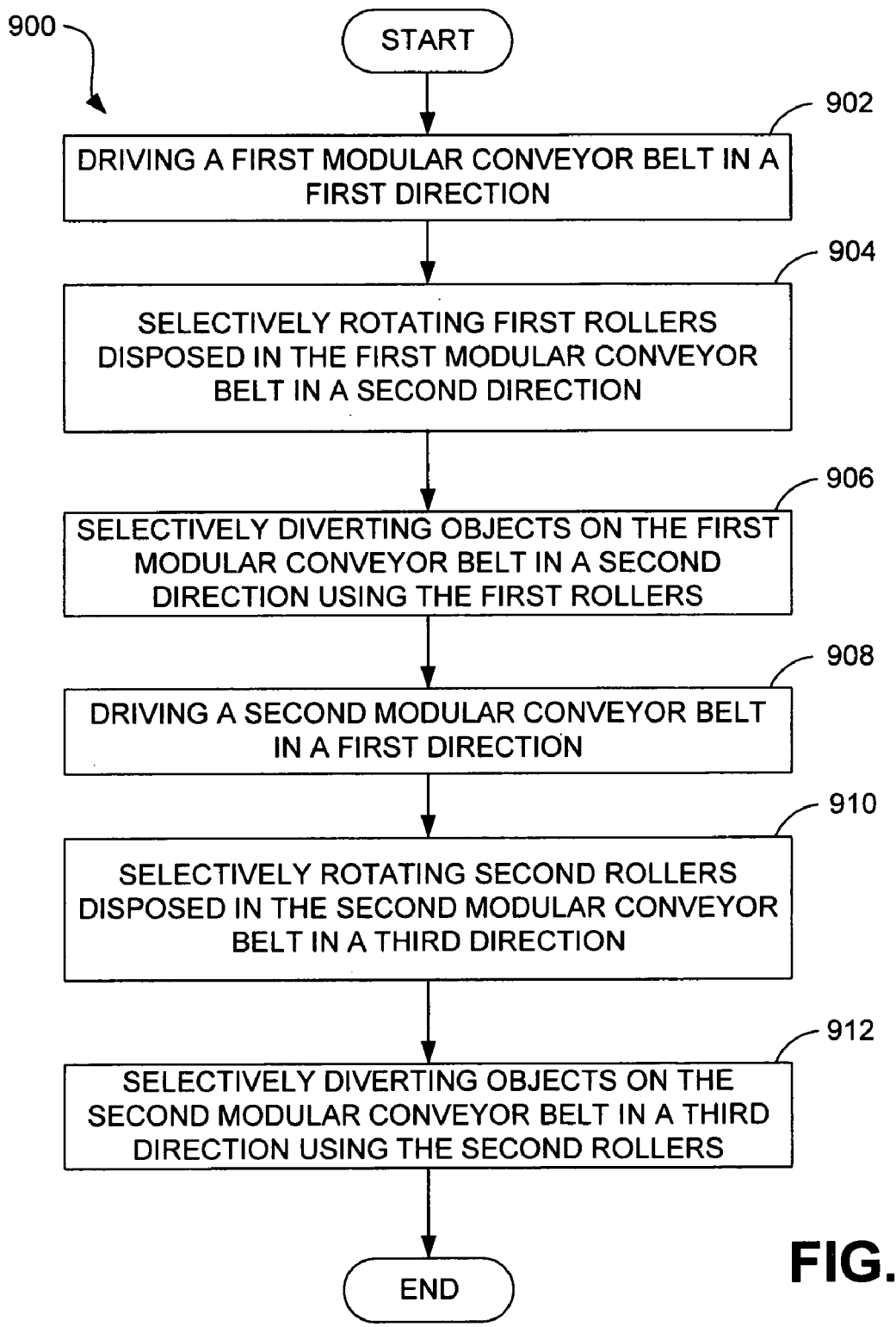
FIG. 9 is a flow diagram that illustrates an embodiment of a method of switching in a conveyor system.

FIG. 9 is a flow diagram that illustrates an embodiment of a method 900 of switching in a conveyor system. Beginning with block 902, the method 900 includes driving a first modular conveyor belt in a first direction.

In block 904, first rollers disposed in the first modular conveyor belt are selectively rotated in a second direction. The first rollers are selectively rotated through, for example, selective alignment and coupling with specific longitudinal rollers. In block 906, objects on the conveyor belt 102 are selectively displaced or diverted in the generally second direction using the first rollers.

In block 908, a second modular conveyor belt is driven in the first direction. It will be appreciated by one of ordinary skill in the art that the second modular conveyor belt may, for example, be adjacent the first modular conveyor belt in a series configuration. In block 910, second rollers disposed in the second modular conveyor belt are selectively rotated in a third direction. The second rollers are selectively rotated through, for example, selective alignment and coupling with specific longitudinal rollers. In block 912, objects on the conveyor belt 102 are selectively displaced or diverted in the generally third direction using the second rollers.

Figure 10:
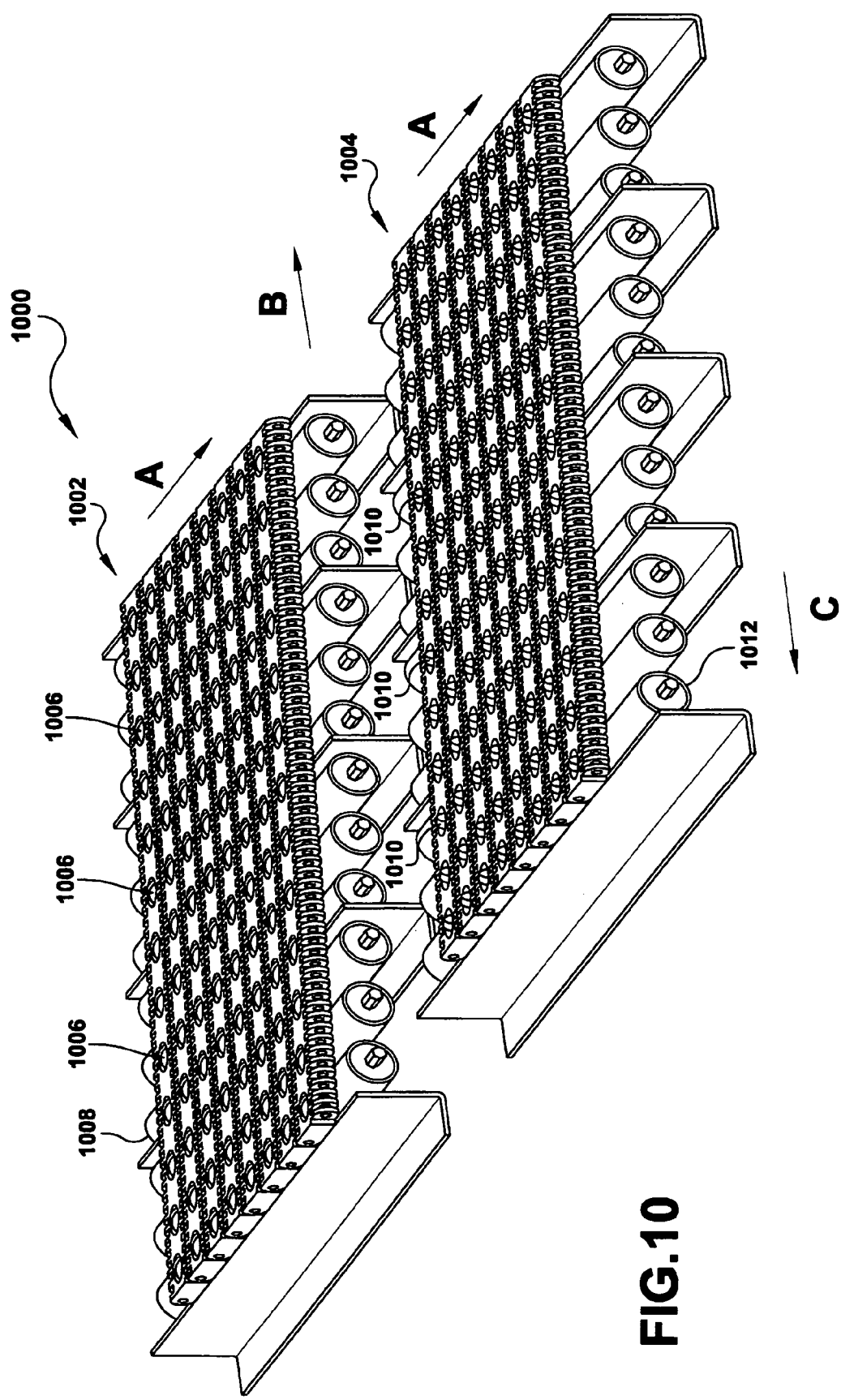
FIG. 10 is a perspective view of an embodiment of an apparatus for switching in a conveyor system.

FIG. 10 illustrates an exemplary embodiment of an apparatus for switching in a conveyor system. As indicated by the figure and in accordance with above described roller operation, the first modular conveyor belt 1002 and the second modular conveyor belt 1004 both travel in direction A. The first modular conveyor belt has first rollers 1006 disposed towards direction B for selectively diverting conveyor objects in the general B direction when the first rollers 1006 are selectively engaged with first longitudinal rollers 1008.

A second modular conveyor 1004 has second rollers 1010 disposed towards direction C for selectively diverting conveyor objects in the general C direction when the second rollers 1010 are selectively engaged with second longitudinal rollers 1012. Although FIG. 10 only illustrates first and second modular conveyor belts 1002, 1004, one of ordinary skill in the art will appreciate that a configuration of more than two modular conveyor belts is consistent with the apparatus and methods disclosed. Further, one of ordinary skill in the art will realize that although the first and second modular conveyor belts of FIG. 10 are illustrated in a serial adjacent relationship, this configuration is merely exemplary and is not intended to limit the scope of the methods and apparatus as disclosed. For example, a conveyor switch may have three modular conveyor belts arranged in a series-parallel configuration (not shown) for selecting five or more alternate conveyor paths. Additionally, an alternate configuration contemplated under these methods includes using one or more modular conveyor belts to selectively divert objects from multiple conveyor lines to fewer or a single conveyor path. Alternatively, reducing multiple lanes of incoming product to a single output lane can be accomplished through the use of a modular conveyor belt with rollers directed towards a center section of the conveyor.

It should be emphasized that the above-described embodiments are merely possible examples. Many variations and modifications may be made to the above-described embodiments. All such modifications and variations are intended to be included herein within the scope of this disclosure.

At least the following is claimed:

1. A conveyor comprising:
   a conveyor belt including a plurality of cavities, a plurality of first diverting rollers, and a plurality of second diverting rollers, each diverting roller being disposed in a cavity;
   at least one first transverse roller having an axis that extends in a direction of travel of the conveyor belt and that can couple to the plurality of first diverting rollers to cause the first diverting rollers to rotate as they travel along the at least one first transverse roller;
   at least one second transverse roller having an axis that extends in the direction of travel of the conveyor belt and that can couple to the plurality of second diverting rollers to cause the second diverting rollers to rotate as they travel along the at least one second transverse roller; and
   wherein each of the plurality of first diverting rollers is oriented at a first angle relative to the direction of travel of the conveyor belt and each of the plurality of second diverting rollers is oriented at a second angle relative to the direction of travel of the conveyor belt.

2. The conveyor as defined in claim 1, wherein the at least one first transverse roller and the at least one second transverse roller are located underneath the conveyor belt, wherein the at least one first transverse roller rotates in a direction transverse to the rotational direction of the first diverting rollers as the conveyor belt travels, and wherein the at least one second transverse roller rotates in a direction transverse to the rotational direction of the second diverting rollers.

3. The conveyor as defined in claim 1, wherein the at least one first transverse roller rotates in a first direction substantially perpendicular to the direction of belt travel when the at least one first transverse roller couples to the plurality of first diverting rollers.

4. The conveyor as defined in claim 3, wherein the at least one second transverse roller rotates in a second direction substantially perpendicular to the direction of belt travel when the at least one second transverse roller couples to the plurality of second diverting rollers.

5. The conveyor as defined in claim 1, wherein the at least one first transverse roller and the at least one second transverse roller are selectively vertically displaceable toward or away from the conveyor belt.

6. The conveyor as defined in claim 5, wherein when the at least one first transverse roller is displaced toward the conveyor belt and engages the plurality of first diverting rollers the at least one first transverse roller rotates the first diverting rollers as the conveyor belt travels, and wherein when the at least one second transverse roller is displaced toward the conveyor belt and engages the plurality of second diverting rollers the at least one second transverse roller rotates the second diverting rollers as the conveyor belt travels.

7. The conveyor as defined in claim 1, wherein the rotation of the at least one first transverse roller causes the first diverting rollers to rotate with reduced slippage.

8. The conveyor as defined in claim 1, wherein the first diverting rollers are aligned in the cavities at a first angle relative to the direction of belt travel enabling the first diverting rollers to convey objects in a first direction transverse to the direction of belt travel.

9. The conveyor as defined in claim 8, wherein the second diverting rollers are aligned in the cavities at a second angle relative to the direction of belt travel enabling the second diverting rollers to convey objects in a second direction transverse to the direction of belt travel.

10. A conveyor comprising:
a first conveyor belt that travels in a direction of belt travel;
a second conveyor belt that travels in the direction of belt travel;
a plurality of cavities disposed in the first conveyor and the second conveyor;
a plurality of first diverting rollers, each first diverting roller disposed in a cavity in the first conveyor;
a plurality of second diverting rollers, each second diverting roller disposed in a cavity in the second conveyor; and
a plurality of transverse rollers having axes that extend along the direction of belt travel, the transverse rollers being adapted to couple to the plurality of first diverting rollers and the plurality of second diverting rollers.

11. The conveyor as defined in claim 10, wherein coupling with the first diverting rollers causes the first diverting rollers to rotate in a first direction transverse to the direction of belt travel.

12. The conveyor as defined in claim 11, wherein the coupling with the second diverting rollers causes the second diverting rollers to rotate in a second direction transverse to the direction of belt travel.

13. The conveyor as defined in claim 10, wherein the plurality of transverse rollers are located underneath the first conveyor belt and the second conveyor belt.

14. The conveyor as defined in claim 10, wherein the plurality of transverse rollers are vertically displaceable toward or away from the first conveyor belt and the second conveyor belt.

15. The conveyor as defined in claim 14, wherein when the plurality of transverse rollers are displaced toward the conveyor belt and engage the plurality of first diverting rollers, the transverse rollers rotate the plurality of first diverting rollers as the first conveyor belt travels.

16. The conveyor as defined in claim 14, wherein when the plurality of transverse rollers are displaced toward the conveyor belt and engage the plurality of second diverting rollers, the transverse rollers rotate the plurality of second diverting rollers as the second conveyor belt travels.

17. A method for conveying objects, the method comprising:
driving a conveyor belt in a first direction;
coupling first diverting rollers disposed in the conveyor belt with a first transverse roller that is free to rotate in a direction that is transverse to the first direction;
coupling second diverting rollers disposed in the conveyor belt with a second transverse roller that is free to rotate in a direction that is transverse to the first direction;
selectively diverting objects from the conveyor belt in a second direction using the first diverting rollers; and
selectively diverting objects from the conveyor belt in a third direction using the second diverting rollers.

18. The method as defined in claim 17, wherein coupling first diverting rollers comprises vertically displacing the first transverse roller toward the conveyor belt and engaging the first diverting rollers, and wherein the driving of the conveyor belt produces rotary motion in both the first diverting rollers and the first transverse rollers as a result of the coupling.

19. The method as defined in claim 18, wherein coupling second diverting rollers comprises vertically displacing the second transverse roller toward the conveyor belt and engaging the second diverting rollers, and wherein the driving of the conveyor belt produces rotary motion in both the second diverting rollers and the second transverse rollers as a result of the coupling.

20. The method as defined in claim 17, further comprising rotating the first diverting rollers at a first angle that is different from the first direction.

21. The method as defined in claim 20, further comprising rotating the second diverting rollers at a second angle that is different from the first direction and that is different from the first angle.

* * * * *